US010817794B1

(12) United States Patent
Chattopadhyay et al.

(10) Patent No.: US 10,817,794 B1
(45) Date of Patent: Oct. 27, 2020

(54) CAUSALITY NETWORK CONSTRUCTION TECHNIQUES

(71) Applicant: Cornell University, Ithaca, NY (US)

(72) Inventors: Ishanu Chattopadhyay, Chicago, IL (US); Hod Lipson, Ithaca, NY (US)

( * ) Notice: Subject to any disclaimer, the term of this patent is extended or adjusted under 35 U.S.C. 154(b) by 840 days.

(21) Appl. No.: 15/172,147

(22) Filed: Jun. 2, 2016

Related U.S. Application Data (60) Provisional application No. 62/170,063, filed on Jun. 2, 2015.

(51) Int. Cl.
*G06N 5/04* (2006.01)
*G06F 9/54* (2006.01)

(52) U.S. Cl.
CPC .............. *G06N 5/048* (2013.01); *G06F 9/542* (2013.01)

(58) Field of Classification Search
CPC ........ G06F 19/00; G06F 19/24; G06F 16/285; G06F 16/35; G06F 16/9024; G06F 2201/86; G06F 17/18; G06F 9/542; G06N 7/005; G06N 5/042; G06N 5/045; G06N 5/046; G06N 5/048; G06N 3/0472
See application file for complete search history.

(56) References Cited

PUBLICATIONS

Taamouti et al., Nonparametric Estimation and Inference for Granger Causality Measures, Mar. 2012. (Year: 2012).*
Chattopadhyay et al., Data Smashing, Jan. 2014. (Year: 2014).*
Asimakopoulos et al., "Non-linear Granger causality in the currency futures returns", Economic Letters, vol. 68, No. 1, pp. 25-60.
Bufe, C.G. et al., "Evidence for a global seismic-moment release sequence", Bulletin of the Seismological Society of America, 95, 2005, pp. 833-843.
Capra, J.A. et al., "Predicting functionally important residues from sequence conversation", Bioinformatics, bol. 23, No. 15, 2007, pp. 1875-1882.
Chattopadhyay, I. et al., "Abductive learning of quantized stochastic processes with probabilistic finite automata", Philos Trans A, 371, 2013, 22 pages.
Chattopadhyay, I. et al., "Data Smashing", ArXiv 1401.0742, 2014.
Chattopadhyay, I., "Causality Networks", eprint arXiv:1406.6651, 2014, 22 pages.
Dahirel, V. et al., "Coordinate linkage of HIV evolution reveals regions of immunological vulnerability", Proc. Natl. Acad. Sci. U.S.A., vol. 108, No. 28, 2011, pp. 11530-11535.
Ferguson, A.D. et al., "Signal transduction pathway of TonB-dependent transporters", Proc. Natl. Acad. Sci. U.S.A., vol. 104, No. 2, 2007, pp. 513-518.
Granger, C.W.J., "Testing for causality: A personal viewpoint", Journal of Economic Dynamics and Control, 2(0), 1980, pp. 329-352.

(Continued)

*Primary Examiner* — Kamran Afshar
*Assistant Examiner* — Marshall L Werner
(74) *Attorney, Agent, or Firm* — Perkins Coie LLP (57) ABSTRACT

Methods, systems, and devices are disclosed for determining causality among data. In one aspect, a method includes receiving a first data and a second data associated with a first event and a second event, respectively; and determining a data set including quantitative causality dependence values between the first and the second data.

12 Claims, 7 Drawing Sheets

(56) References Cited

PUBLICATIONS

Granger, C.W.J., "Investigating causal relations by econometric models and cross-spectral methods", Econometrica, vol. 37, No. 3, 1969, pp. 424-438.

Halabi, N. et al., "Protein sectors: evolutionary units of three-dimensional structure", Cell, vol. 138, No. 4, 2009, pp. 774-786.

Johnson, S.M. et al., "Distinguising between random and nonrandom patterns in the energy release of great earthquakes", Journal of Geophysical Research: Solid Earth, 102, 1997, pp. 2853-2855.

Lockless, S.W. et al., "Evolutionarily conserved pathways of energetic connectivity in protein families", Science, vol. 286, No. 5438, 1999, pp. 295-299.

Marsan, D. et al., "Seismicity response to stress perturbations, analysed for a world-wide catalogue", Geophysical Journal International, 154, 2003, pp. 179-195.

Marzocchi, W. et al., "On the long-term interaction among eathquakes: Some insight from a model simulation", Journal of Geophysical Research: Solid Earthh, 108, 2003.

Marzocchi, W. et al., "Long-term influence of giant earthquakes: Backward empirival evidence and forward test", Bulletin of the Seismological Society of America, 98, 2008, pp. 1102-1112.

Melini, D. et al., "New insights on long distance fault interaction", Earth and Planetary Science Letters, 204, 2002, pp. 363-372.

NG, P.C. et al., "Predicting the effects of amino acid substitutions on protein function", Annu Rev Genomics Hum Genet, vol. 7, 2006, pp. 61-80.

Pollitz, F.F. et al., "Viscosity of oceanic asthenosphere inferred from remote triggering of earthquakes", Science, 180, 1998, pp. 1245-1249.

Romanowicz, B., "Spatiotemporal patterns in the energy release of great earthquakes", Science, 260, 1993, pp. 1923-1926.

Santoyo, M.A. et al., "Spacetime clustering of large thrust earthquakes along the mexican subduction zone: An evidence of source stress interaction", Bulletin of the Seismological Society of America, 95, 2005, pp. 1856-1864.

\* cited by examiner

CAUSALITY NETWORK CONSTRUCTION TECHNIQUES

PRIORITY CLAIM AND RELATED PATENT APPLICATION

This patent document claims the priority of and the benefits of U.S. Provisional Application No. 62/170,063 entitled "CAUSALITY NETWORK CONSTRUCTION TECHNIQUES" filed on Jun. 2, 2015, which is incorporated by reference as part of the disclosure of this patent document.

STATEMENT REGARDING FEDERALLY SPONSORED RESEARCH OR DEVELOPMENT

This invention was made with government support under grant W911NF-12-1-0499 (E55-8011) awarded by the Army Research Office. The government has certain rights in the invention.

TECHNICAL FIELD

This patent document relates to systems, devices, and processes for determining causality among data.

BACKGROUND

Causation or causality relationships are important in many applications. In a simple causation relation, one process can be the cause to trigger another process as a result or effect. In various situations, different processes can be causes to trigger different processes as results or effects. "Correlation does not imply causation" is a lesson taught early and often in statistics. Yet, the next question is: then, how do we then test for causality? This is an old question debated in philosophy law, statistics, and other fields, e.g., recently in learning theory.

The concept of causality has been explored by many, including C. W. J. Granger. Yet, there is a lack of consensus on how to infer causal relationships from data, which is perhaps ascribable to the difficulty in making this intuitive notion mathematically precise. Generally, Granger's notion is intuitively simple: Y is a cause of X, if it has unique information that alters the probabilistic estimate of the immediate future of X. Not all notions of causal influence are expressible in this manner, neither can all philosophical subtleties be adequately addressed. Granger's motivation was more pragmatic, as he was primarily interested in obtaining a mathematically precise framework that leads to an effective or algorithmic solution, that is a concrete statistical test for causality.

SUMMARY

Various implementations of the Granger causal inference are based on the assumption of linearity. Many linear tests demonstrably fail to uncover non-linear influence. On the other hand, various non-linear tests often assume the class of allowed non-linearities; thus not do not quite remove the pre-supposed structure. Non-parametric approaches, e.g. the Hiemstra-Jones test, can be implemented to successfully dispense with pre-suppositions on structure, but are at the cost of failing to produce a generative model of inferred causation. Various nonparametric Granger tests merely test for the existence of a causal relationship in the framework of a classical binary hypothesis testing but do not provide information on the strength of causal influence.

The technology disclosed in this document can be implemented to provide nonparametric causation inference algorithms without making presupposition of linearity and to produce link-specific directional generative models of causal influence. These generative models can be used to construct a causality network, and predict future behavior of a modeled system in various applications. The nonparametric causation inference algorithms based on the disclosed technology can compute direction specific coefficients for causal dependence. In an example of two processes or steams 1 and 2, the disclosed technology can determine a direction specific coefficient for causal dependence by computing the ratio of the expected change in the entropy of the predicted future in stream 2 conditioned over observations in the stream 1 to the entropy of the predicted future in stream 2 if no observations are made on stream 1. This coefficient quantifies the amount of additional information that observation on the stream 1 provide about the immediate future in stream 2.

The link-specific directional generative models of causal influence based on the disclosed technology can be used in many practical applications. Examples of such applications include disaster prediction (e.g., earthquakes, extreme weather conditions, occurrences of epidemics in a population), prediction of stock market movements, pricing or demands and supplies of goods or services in seemingly chaotic market conditions, traffic controls for flights or vehicles, prediction of behaviors of power networks for management and operations of the power networks, prediction of behaviors of communication networks for management and operations of communication networks, prediction of user behaviors in social networks, prediction of behaviors of e-commerce activities, and biomedical applications (e.g., inferring functional connectivity in neuronal assemblies and prediction of molecular evolution of retro-viral genomes). As a specific example, the disclosed techniques can be used for financial time series modeling and prediction, e.g., capable of devising strategies for high frequency trading, and portfolio management. For another example, the disclosed techniques can be used for modeling seismic dynamics, devising predictors for earthquakes, and devising policies for seismic risk management. For another example, the disclosed techniques can be used for modeling molecular evolution of retroviral genomes, e.g., the long range high order conservations in the mutating HIV genome. For example, the disclosed techniques can be used for modeling epidemiology of different diseases, e.g. the spatio-temporal causality in the spread of seasonal influenza. In those and other applications, the disclosed technology can be used to provide predictions beyond a single evat or occurrence, modeling the entire stock market rather than just a single stock or predicting the effect of an earthquake in one region on the entire worldwide earthquake system rather than a single earthquake.

This patent document include, in one aspect, methods to construct non-parametric models of directional causal dependence between data streams. Given multiple time-synchronized streams of data, the disclosed techniques can compute models of cross-dependence between each pair of streams. e.g., one for each direction. For example, the disclosed techniques can compute a coefficient of causality for each pair and each direction, resulting finally in a directed graph (denoted as the causality network), which captures the flow of causal influence among the different input streams. The inferred coefficients are asymmetric, which reflects the ability to capture directional flow of causality. The disclosed technology can be viewed as a non-parametric non-linear implementation of Granger's notion of statistical causality.

The above and other aspects and their implementations of the disclosed technology are described in greater detail in the drawings, the description and the claims.

BRIEF DESCRIPTION OF THE DRAWINGS

FIG. 3A (Plate A) illustrates an example for the notion of self-models. Historical data is first represented as a symbol sequence (denoted as "Data stream" in plate A) using space-time discretization and magnitude quantization. For example, we may use a spatial discretization of +/−3° in both latitudes and longitudes, a temporal discretization of 1 week, and a binary magnitude quantization that maps all magnitudes below 4:0 to symbol 0, and all higher magnitudes to symbol 1. This symbol stream then represents a sample path from a hidden quantized stochastic process. A self-model is a generative model of this data stream, which captures symbol patterns that causally determine (in a probabilistic sense) future symbols. Specifically, our inferred self-model (See plate A(i) for an example) is a probabilistic finite state automata (PFSA). FIG. 3B (Plate B) illustrates an example for the notion of cross-models. Instead of inferring a model from a given stream to predict future symbols in the same stream, we now have two symbol streams (Data stream I and Data stream II), and the cross-model is essentially a generative model that attempts to predict symbols in one stream by reading historical data in another. Notably, as shown in plate B(i), the cross-model is syntactically not exactly a PFSA (arcs have no probabilities in the cross-model, but each state has an output distribution). We call such models crossed probabilistic finite state automata (XPFSA). Once these models are inferred, they may be used to predict future evolution of the streams. Thus, the self-model in plate A may be initialized with its unique stationary distribution, and then a relatively short observed history would dictate the current distribution on the model states, which in turn would yield a distribution over the symbol alphabet in the next time step. FIG. 3B shows a cross-model to get future symbol distribution in the second stream, given a short history in the first stream. Note that the cross-model from I to II is not necessarily the same as the one in the other direction.

FIG. 4 shows an example for illustrating causal states. (Plate A) Shows a probabilistic finite state automata which generates a stationary ergodic quantized stochastic process $H_A$, taking values over the alphabet $\Sigma = \{\sigma_0, \sigma_1\}$. (Plate B) The meaning of the states is illustrated. The set of all possible histories or sequences produced by the process $H_A$ may be split into two classes, which contain respectively all sequences ending in $\sigma_0$ and $\sigma_1$. This classes represent the states $q_0$ and $q_1$ respectively. For any string in the class mapping to $q_0$, the next symbol is distributed as [0.85 0.15] and for any string in the class mapping to $q_1$, the next symbol is distributed as [0.25 0.75] over the alphabet $\Sigma$. Note that this is dictated by the structure of the generative model shown in plate A, e.g., it is easy to follow the edges, and conclude that any string terminating in $\sigma_0$ ends in state $\sigma_0$ irrespective of where it starts from. Thus, $H_A$ has two causal states, since there is only two such classes of histories that lead to different future evolution of any generated sequence.

FIG. 5 shows a detailed example of crossed probabilistic Finite State Automata. (Plate A) illustrates a PFSA, while plates B and C illustrate crossed automata capturing dependency between two ergodic stationary processes. The machine in plate B captures dependency from a process evolving over a 2-letter alphabet $\{\sigma_0, \sigma_1\}$ to a process evolving over a 3-letter alphabet $\{\sigma'_0, \sigma'_1, \sigma'_2\}$. Plate C illustrates a XPFSA capturing dependency between processes over the same 2-letter alphabets $\{\sigma_0, \sigma_1\}$. Note that XPFSAs differ structurally from PFSAs; while the latter have probabilities associated with the transitions between states, the former have no such specification. XPFSAs on the other hand have an output distribution at each state, and hence each time a new state is reached, XPFSAs may be thought to generate an output symbol drawn from the state-specific output distribution. It follows that one could represent a PFSA as a XPFSA as shown in plate D. The output distribution in this case must be on the same alphabet, and the probability of outputting a particular symbol at a particular state would be the generation probability of that symbol from that state.

FIG. 6 shows an example for processes with uni-directional dependence. For the system description tabulated above, we get the two self-models (plates A and B) which are single state PFSAs. It also follows that process $H_A$ cannot predict any symbol in process $H_B$, and we get the XPFSA from A to B as a single state machine as well (plate C). However, process $H_A$ is somewhat predictable by looking at $H_B$, and we have the XPFSA with two states in this direction (plate D). Note the tabulated coefficients of dependence in the two directions. Since for this example, $H_A$ is the Bernoulli-1/2 process with entropy rate of 1 bit/letter, it follows that making observations in the process $H_B$ reduces the entropy of the next-symbol distribution in $H_A$ by 0.2781 bits.

DETAILED DESCRIPTION

While correlation measures are used to discern statistical relationships between observed variables in almost all branches of data-driven scientific inquiry, the disclosed technology goes beyond such correlation measures and focuses on the existence of causal dependence. Statistical tests for causality are significantly harder to construct; the difficulty stemming from both philosophical hurdles in making precise the notion of causality, and the practical issue of obtaining an operational procedure from a philosophically sound definition. In particular, designing an efficient causality test, that may be carried out in the absence of restrictive pre-suppositions on the underlying dynamical structure of the data at hand, is non-trivial. Nevertheless, ability to computationally infer statistical prima facie evidence of causal dependence may yield a far more discriminative tool for data analysis compared to the calculation of simple correlations.

The disclosed technology provides a new non-parametric test of Granger causality for quantized or symbolic data streams generated by ergodic stationary sources. In contrast to state-of-art binary tests, the disclosed technology can be implemented to compute the degree of causal dependence between data streams, without making any restrictive assumptions, linearity or otherwise. Additionally, without any a priori imposition of specific dynamical structure, the disclosed technology can be used to infer explicit generative models of causal cross-dependence, which may be then used for prediction. These explicit models are represented as generalized probabilistic automata, referred to crossed automata, and are shown to be sufficient to capture a fairly general class of causal dependence. The disclosed methods and systems include implementation of algorithms that are computationally efficient in PAC sense (Probably Approximately Correct); i.e., good models of cross-dependence can be generated to provide high probability, with polynomial run-times and sample complexities.

Various implementations of linear causality tests presuppose restrictive and often unrealistic structure on data. Some present a simple bivariate model to analytically demonstrate the limitations of linear tests in uncovering nonlinear influence. Some nonlinear tests address this issue, e.g., with generalized autoregressive conditional heteroskedasticity (GARCH) models, using wavelet transforms, or heuristic additive relationships. However, such approaches often assume the class of allowed non-linearities; thus not quite alleviating the problem of pre-supposed structure. This is not just an academic issue; Granger causality has been shown to be significantly sensitive to non-linear transformations.

On the other hand, various non-parametric approaches, e.g. the Hiemstra-Jones (HJ) test, attempt to completely dispense with pre-suppositions on the causality structure. Given two series $X_t$ and $Y_t$, the HJ test (which is a modification of the Back-Brock test) uses correlation integrals to test if the probability of similar futures for $X_t$ given similar pasts, change significantly if we condition instead on similar pasts for both $X_t$ and $Y_t$ simultaneously. Nevertheless, the data series are required to be ergodic, stationary, and absolutely regular i.e. β-mixing, with an upper bound on the rate at which the β-coefficients approach zero, in order to achieve consistent estimation of the correlation integrals. The additional assumptions beyond ergodicity and stationarity serve to guarantee that sufficiently separated fragments of the data series are nearly independent. The HJ test and its variants have been quite successful in econometrics; uncovering nonlinear causal relations between money & income, aggregate stock returns & macroeconomic factors, currency future returns, and stock price & trading volume. Surprisingly, despite clear evidence that linear tests typically have low power in uncovering nonlinear causation, application of non-parametric tests has been limited in areas beyond financial, or macroeconomic interests.

The HJ test and its variants are specifically designed to detect presence of Granger causality at a pre-specified significance level; there is no obvious extension by which a generative nonlinear model of this cross-dependence may be distilled from the data at hand. By analogy, such tests leave us with an oracle in a black box—it answers questions without any insight on the dynamical structure of the system under inquiry. On the other hand, linear regression-based, as well as parametric nonlinear approaches, have one discernible advantage; they produce generative models of causal influence between the observed variables. Hiemstra's suggestion was to view non-parametric tests purely as a tool for uncovering existence of non-linearities in system dynamics; leaving the task of detailed investigation of dynamical structure to parametric model-based approaches.

This is perhaps the motivation behind applying the HJ test to error residuals from an estimated linear autoregressive model; by removing linear structure using regression, any additional causal influence should be nonlinear in origin.

In this context, is it completely unreasonable to ask for a generative model of causal cross-dependence, where we are unwilling to a priori specify any dynamical structure? The disclosure in this patent document shows that such an undertaking is indeed fruitful; beginning with sequential observations on two variables, it is possible to infer non-heuristic generative models of causal influence with no pre-supposition on the nature of the hidden dynamics, linear or nonlinear.

The undertaking by the disclosed technology in this document is a non-trivial exercise. To allow dynamical models with unspecified and unrestricted structure, the framework within which such inference is carried out needs to be restructured. It is well understood that this task may be unattainable in the absence of at least some broad assumptions on the statistical nature of the sources, particularly on the nature of temporal or sequential variation in the underlying statistical parameters. Various implementations may restrict to ergodic and stationary sources, and may assume that the data streams take values within finite sets; i.e., ergodic, stationary quantized stochastic processes.

For two streams, generative models of causal influence may be represented as generalized probabilistic automata, referred to as crossed automata. Accordingly, the task is reduced to inferring these crossed machines from data, in the absence of a priori knowledge of structure and parameters involved. True to the possible asymmetric nature of causality, such inferred logical machines are direction-specific; the crossed machine capturing the influence from stream $s_A$ to stream $s_B$ is not required to be identical to the one from $s_B$ to $s_A$. Additionally, in implementations, the absence of causal influence between data streams may manifest as a trivial crossed machine, and the existence of such trivial representations in both directions is necessary and sufficient for statistical independence between the data streams under consideration.

The generative models of causal dependence can be used carry out out-of-sample prediction. By comparison, some implementations of the HJ test may be vulnerable to Granger's objection and, in absence of an inferred model, one is not strictly adhering to the original definition of Granger causality, which requires improved predictive ability, and not simply analysis of past data. Some implementations of model-based approaches may make and test predictions and are at the cost of the pre-imposed model structure (See proposed recipe in Granger, C. W. J. (1980). *Testing for causality: A personal viewpoint. Journal of Economic Dynamics and Control*, 2(0):329-352).

The disclosed technology in this document, in contrast, can be implemented to produce generative models without pre-supposed structure, and, accordingly, can be used to carry out and test predictions without the aforementioned cost.

In addition to obtaining explicit models of causal dependence between observed data streams, the disclosed technology can be used to identify a new test for Granger causality, for quantized processes (i.e. processes which take values within a finite set). In this regard, the disclosed technology can be implemented to compute the coefficient for causal dependence $\gamma_B^A$, from the process generating a stream $s_A$ to the process generating a stream $s_B$. This coefficient is the ratio of the expected change in the entropy of the next-symbol distribution in stream $s_B$ conditioned over observations in the stream $s_A$ to the entropy of the next-symbol distribution in stream $s_B$, conditioned on the fact that no observations are made on stream $s_A$. The coefficient $\gamma_B^A$ takes values on the closed unit interval, and higher values indicate stronger predictability of $s_B$ from $s_A$, i.e., a higher degree of causal influence. Thus, true to Granger's notion of causality, coefficient $\gamma_B^A$ quantifies the amount of additional information that observation on the stream $s_A$ provide about the immediate future in stream $s_B$. Streams $s_A$, $s_B$ are statistically independent if and only if $\gamma_B^A = \gamma_A^B = 0$. The examples where $\gamma_B^A = 0$ and $\gamma_A^B > 0$ can illustrate the existence of directional influence.

It is important to note that other techniques, including the HJ test, merely "test" for the existence of a causal relationship; setting up the problem in the framework of a classical binary hypothesis testing. Implementations of HJ test and other techniques often fail to infer the degree of the causal connection, once the existence of such a relationship is statistically established. The statistical significance of the tests is not easily related to the degree of causality. In contrast, the coefficient $\gamma_B^A$ provides the degree of causality: higher values of the coefficient indicate a stronger causal connection; and $\gamma_B^A = 1$ indicates a situation in which the symbol in the immediate future of $s_B$ is deterministically fixed given the past values of $s_A$, but looks completely random if only the past values of $s_B$ are available.

While the HJ test and the computational inference of the coefficient of causality may impose similar assumptions on the data, the assumptions in the latter case may be more physically transparent. Both approaches require ergodicity and stationarity; the HJ test further requires the processes to be absolutely regular (β-mixing), with a certain minimum asymptotic decay-rate of the β coefficients. Absolute regularity is one of the several ways of obtaining weak dependence so that two sufficiently separated fragments of a data stream are nearly independent. The disclosed algorithms utilize weak dependence in addition to stationarity and ergodicity; however instead of invoking mixing coefficients, the processes of the disclosed techniques have a finite number of causal states. Causal states are equivalence classes of histories that produce similar futures; and hence a finite number of causal states dictates that we need a finite number of classes of histories for future predictions.

As for the computational cost of the algorithms, the inference of the crossed automata is PAC-efficient, i.e., inferring good models with high probability, in asymptotically polynomial time and sample complexity.

The disclosed technology includes the following features: (1) A new non-parametric test for Granger causality for quantized processes is introduced. Going beyond binary hypothesis testing, we quantify the notion of the degree of causal influence between observed data streams, without pre-supposing any particular model structure. (2) Generative models of causal influence are shown to be inferrable with no a priori imposed dynamical structure beyond ergodicity, stationarity, and a form of weak dependence. The explicit generative models may be used for prediction. (3) The disclosed algorithms are shown to be PAC-efficient.

The disclosed technology can be implemented in various ways. A computer implemented method can be implemented using an causality network construction engine that is configured on a computer system setup for a commercial entity. For example, the causality network construction engine can include software modules implemented by the computer system, e.g., including a data collection module to obtain data across various data streams (e.g., established on a website to aggregate data from various Internet-based sources for various applications), and a data processing module that interacts with a database stored on one or more computers of the computer system and/or of other computer systems. The software modules of the causality network construction engine can operate on one or more computers of the computer network to communicatively interact in a communications network (e.g., 'the cloud').

Figure 1A:
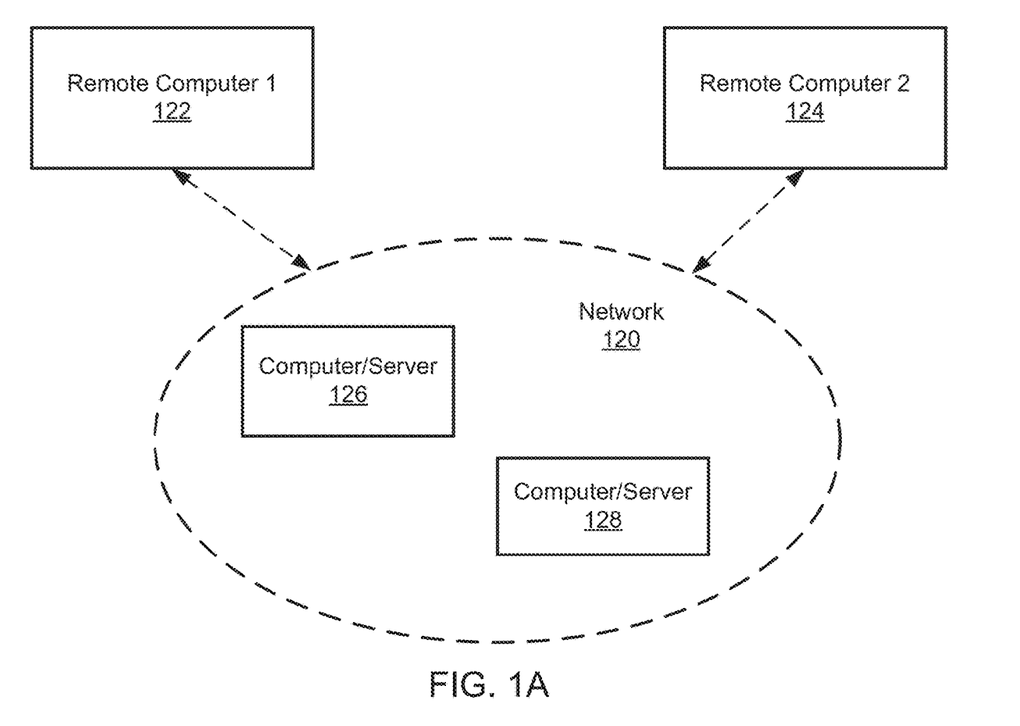
FIG. 1A shows an example of a communication network of computer systems for providing causality network construction and analysis to determine causality between data.

FIG. 1A shows an example of a communication network 120 for providing causality network construction and analysis to determine causality (e.g., causal dependence) between data of data streams. The communication network includes computers or servers 126, 128 and communicates with remote computers, servers or computing devices 122, 124. The computers or servers 126, 128 in the network 120 can be configured to include the causality network construction engine capable of implementing the disclosed methods in real-time. For example, the remote computers or computing devices 122, 124 can include desktop and laptop computers, tablets, smartphone devices, and wearable communication devices (e.g., smartglasses, smartwatch, etc.). The causality network construction engine can be configured on one or more computers or servers 126, 128 and operated by a single entity or multiple entities. For example, software modules of the causality network construction engine can reside on the computers or servers 126, 128; and in some implementations, for example, some of the software modules can reside on the remote computers or computing devices 122, 124.

Figure 1B:
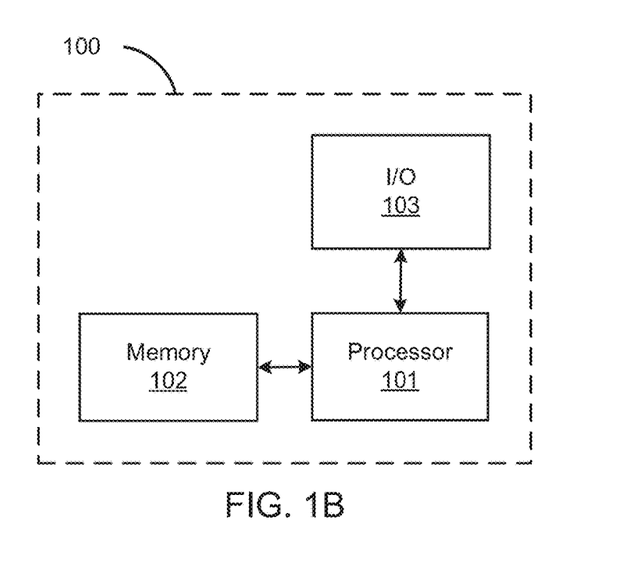
FIG. 1B shows an example of a computer having a central processing unit, memory unit, and input/output unit that can be used in the network in FIG. 1A.

The computers or servers 126, 128 and/or the remote computers, servers, or computing devices 122, 124 can be configured as a computer 100 having a central processing unit, memory unit, and input/output unit, as shown in FIG. 1B. The computer 100 includes a central processing unit 101 to process data and a memory unit 102 in communication with the central processing unit 101 to store data. The computer 100 includes an input/output (I/O) unit 103 in communication with the central processing unit 101 that provides wired and/or wireless interfaces compatible with typical data communication standards for communication of the computer with other computers and computer systems, or external interfaces, sources of data storage, or display devices, among others. For example, the memory unit 102 can include processor-executable code, which when executed by the central processing unit 101, configures the computer 100 to perform various operations, such as receiving information, commands, and/or data, processing information and data, and transmitting or providing information/data to another entity or to a user. For example, the I/O unit 103 can provide wired or wireless communications using one or more of the following communications standards. e.g., including, but not limited to, Universal Serial Bus (USB), IEEE 1394 (FireWire), Bluetooth, IEEE 802.11, Wireless Local Area Network (WLAN), Wireless Personal Area Network (WPAN). Wireless Wide Area Network (WWAN), WiMAX, IEEE 802.16 (Worldwide Interoperability for Microwave Access (WiMAX)), 3G/4G/LTE cellular communication methods, and parallel interfaces, among others. In some implementations, the computer 100 can be included in the network 120 as a computer or server 126, 128 and/or as a remote computer 122, 124 and in communication with other computers via the Internet.

Implementations of the subject matter and the functional operations described in this patent document and attached appendices can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

The following sections describe examples of implementations of causality networks and associated algorithms based on the disclosed technology, including certain specific technical details in such examples.

Figure 2:
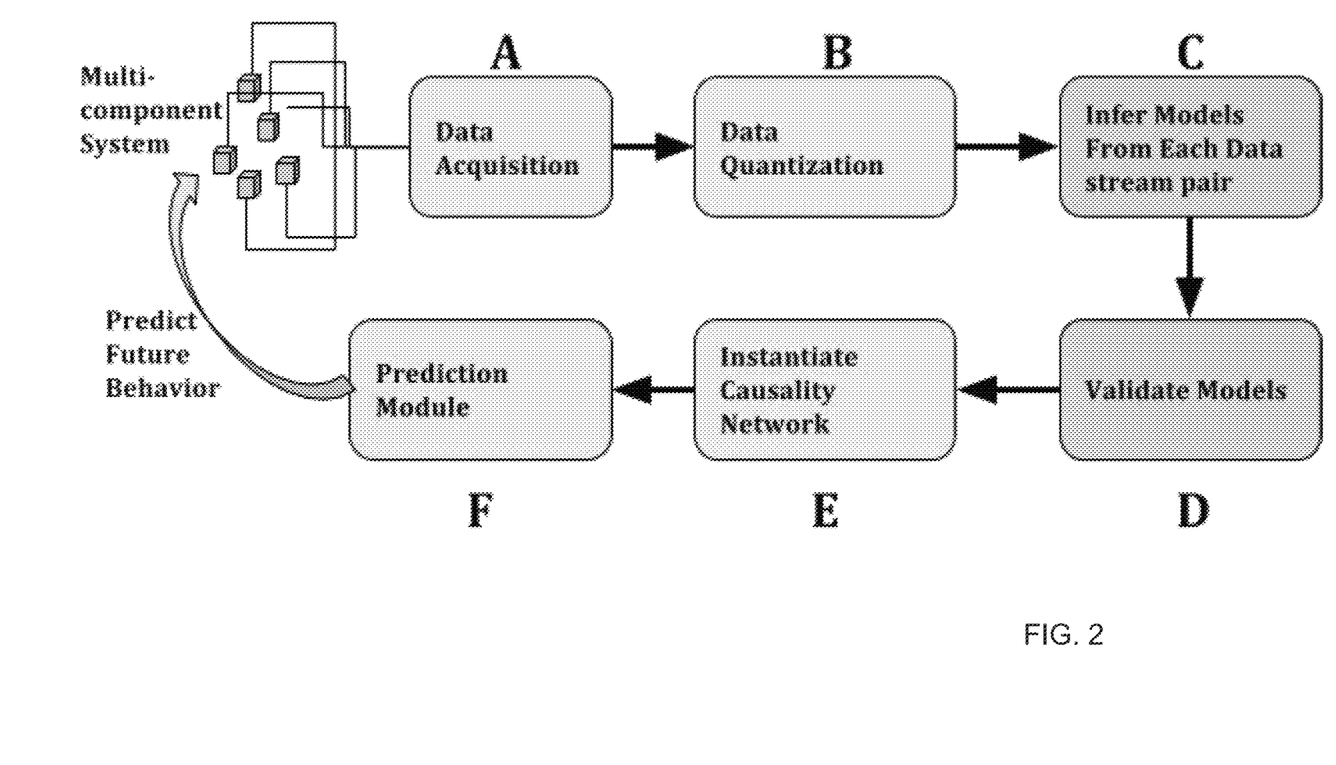
FIG. 2 shows an example of a process for processing data from a system and generating generative models of causal influence of the system based on the disclosed technology.

FIG. 2 shows an example of a process for processing data from a system and generating generative models of causal influence of the system based on the disclosed technology. This example process includes the following steps performed by different function modules: (A) acquiring data from the system to be modeled by a Data Acquisition Module where n input data streams are acquired from a system having n components; (B) quantizing the acquired data by a Data Quantization Module which may, e.g., quantize possibly continuous valued data to symbolic streams; (C) inferring models for each pair of input streams for each direction by a Model Inference Module; (D) using a Validation Module to validate correctness of models using data smashing; (E) instantiating a causality network using inferred models on each link by using a Network Instantiation Module; and (F) using a Prediction Module to predict behavior of the system of interacting sub-systems based on the causality network.

Examples for implementing the details in FIG. 2 are described in detail below.

First, the convention ways for the Granger causal inference are described. Suppose that one is interested in the possibility that a vector series $Y_t$ causes another vector $X_t$. Let $J_n$ be an information set available at time n, having terms of the vector series $Z_t$:

$$J_n = \{Z_t : t \leq n\} \tag{1}$$

where Jn is said to be a proper information set with respect to $X_t$, if $X_t$ is included within $Z_t$. Further, suppose that $Z_t$ does not include any component of $Y_t$, and define $$J'_n = \{(Z_t, Y_t) : t \leq n\} \tag{2}$$

Inferring causality in the mean is easier, and if one is satisfied with using minimum mean square prediction error as the criterion to evaluate incremental predictive power, then one may use linear one-step-ahead least squares predictors to obtain an operational procedure: if $VAR(X \vee _n)$ is the variance of one-step forecast error of $X_{n+1}$ given $J_n$, then Y is a prima facie cause of X with respect to $J'_n$ if:

$$VAR(X \vee _n) < VAR(X \vee _n) \tag{3}$$

Testing for bivariate Granger causality in the mean involves estimating a linear reduced-form vector autoregression:

$$X_t = A(L)X_t + B(L)Y_t + U_{X,t} \tag{4}$$

$$Y_t = C(L)X_t + D(L)Y_t + V_{Y,t} \tag{5}$$

where A(L), B(L), C(L), and D(L) are one-sided lag polynomials in the lag operator L with roots all-distinct, and outside the unit circle. The regression errors $U_{X,t}$, $V_{Y,t}$ are assumed to be mutually independent and individually i.i.d. with zero mean and constant variance. A standard joint test (F or $X^2$-test) is used to determine whether lagged Y has significant linear predictive power for current X. The null hypothesis that Y does not strictly Granger cause X is rejected if the coefficients on the elements in B(L) are jointly significantly different from zero.

Linear tests pre-suppose restrictive and often unrealistic structure on data. Brock presents a simple bivariate model to analytically demonstrate the limitations of linear tests in uncovering nonlinear influence. To address this issue, a number of nonlinear tests have been reported, e.g., with generalized autoregressive conditional heteroskedasticity (GARCH) models, using wavelet transforms, or heuristic additive relationships. However, these approaches often assume the class of allowed non-linearities; thus not quite alleviating the problem of presupposed structure. Granger causality has been shown to be significantly sensitive to non-linear transformations.

Non-parametric approaches, e.g. the Hiemstra-Jones (HJ) test on the other hand, attempt to completely dispense with pre-suppositions on the causality structure. Given two series $X_t$ and $Y_t$, the HJ test (which is a modification of the Baek-Brock test) uses correlation integrals to test if the probability of similar futures for $X_t$ given similar pasts, change significantly if we condition instead on similar pasts for both $X_t$ and $Y_t$ simultaneously. Nevertheless, the data series are required to be ergodic, stationary, and absolutely regular i.e., β-mixing, with an upper bound on the rate at which the β-coefficients approach zero, in order to achieve consistent estimation of the correlation integrals. The additional assumptions beyond ergodicity and stationarity serve to guarantee that sufficiently separated fragments of the data series are nearly independent. The HJ test and its variants, have been quite successful in econometrics; uncovering nonlinear causal relations between money & income, aggregate stock returns & macroeconomic factors, currency future returns and stock price & trading volume. Surprisingly, despite clear evidence that linear tests typically have low power in uncovering nonlinear causation, application of non-parametric tests has been limited in areas beyond financial, or macroeconomic interests.

Non-Parametric Approach Based on Probabilistic Automata

We use a new non-parametric test for Granger causality for quantized processes. Going beyond binary hypothesis testing, we quantify the notion of the degree of causal influence between observed data streams, without presupposing any particular model structure. Generative models of causal influence are inferred with no a priori imposed dynamical structure beyond ergodicity, stationarity, and a form of weak dependence. The explicit generative models may be used for prediction. The proposed inference algorithms are PAC-efficient, i.e., we bare guaranteed to find good models with high probability, and with small sample complexity.

The following sections describe the notion of probabilistic automata, the inference problem, the notion of causal states, and the decision fusion strategy for multiple models.

Self Models

The quantized data streams from the event catalogue may be viewed as sample paths from hidden quantized stochastic processes that drive the observed dynamics. A self-model for such a stream is a generative model that captures statistically significant symbol patterns that causally determine (in a probabilistic sense) future symbols. A good modeling framework for such self-models are probabilistic finite state automata (PFSA).

Figure 3A:
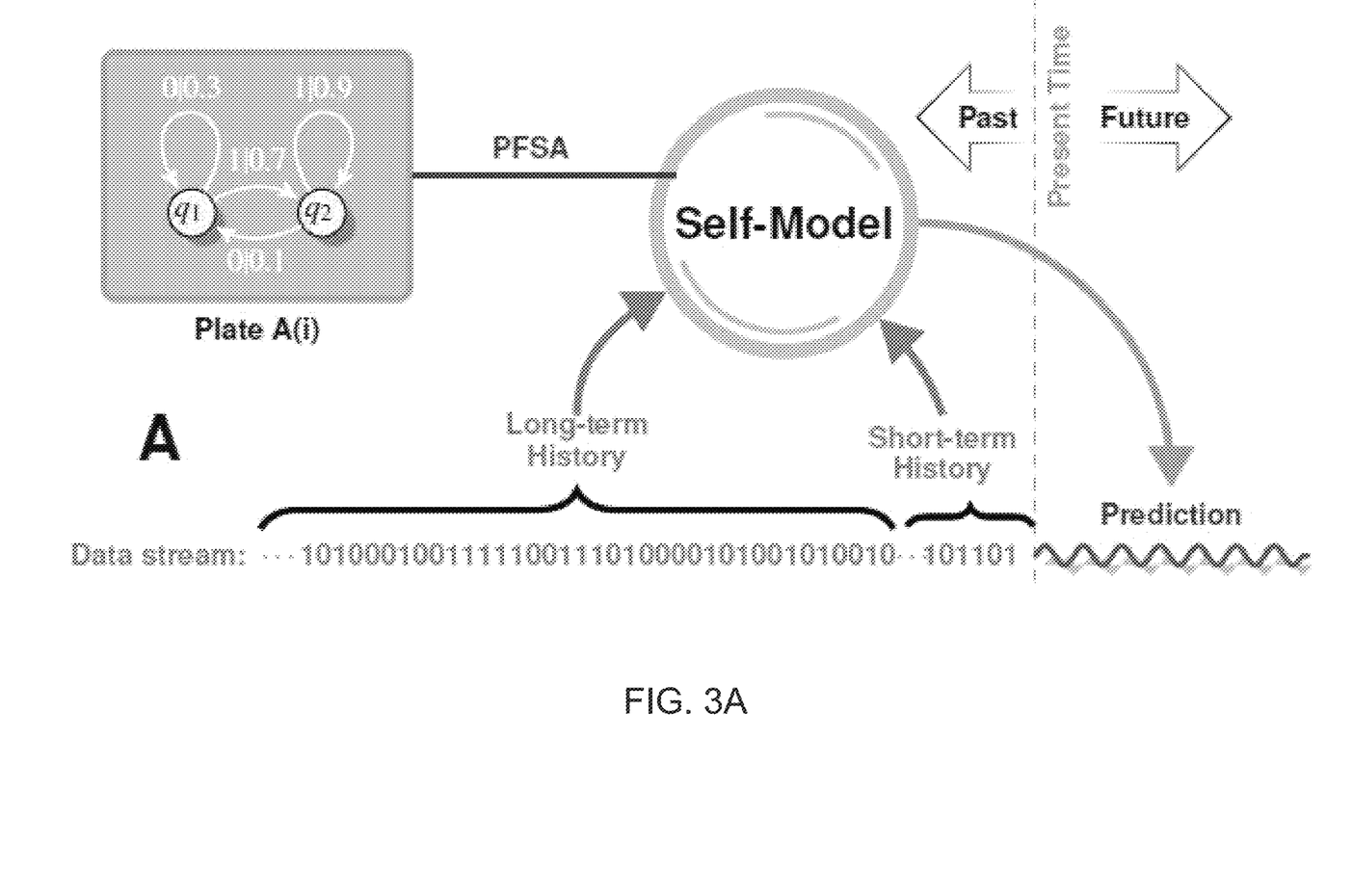
FIGS. 3A and 3B show Intuitive description of self and cross models.

FIG. 3A shows an example of such a self model based on a simple PFSA with two states generated from a binary symbol sequence. In this particular example, a sequence 11 localizes or synchronizes the machine to state $q_2$, which then implies that the next symbol is a 0 with probability 0.1 and a 1 with probability 0.9. Thus, given this self-model for the stream, and the short history 11, we can predict the symbol distribution in the next time step. Notably, the states in a PFSA are not the alphabet symbols themselves, but are equivalence classes of symbol sequences (histories) that lead to statistically equivalent futures. This particular example has two states not because of the fact that the alphabet is binary, but because there are only two distinct distributions that dictate the next symbol from any point in the dynamical evolution; it is distributed as either [0.1 0.9] or [0.3 0.7] over the binary event alphabet, and the current context or "state" dictates which distribution is in effect. These contexts are simply equivalence classes of historical sequences that could have possibly lead to the present; which specific history belonging to the current equivalence class actually transpired makes no difference in future. Hence these classes are dynamical states for the discrete stochastic evolution of the system at hand. The transition structure of the PFSA (the labeled edges with probabilities in the graph) specify how we move between these classes as new symbols are generated, or new data is acquired.

The inference problem here is to determine both the number of states and the transition structure given a sufficiently long quantized data stream. In our unsupervised approach, there are no restrictions on admissible graphs for the inferred PFSA, and no a priori constraints on the number of states that may appear.

Thus, the number of states inferred by our algorithm is a direct measure of the statistical complexity of the underlying process. A single-state self model implies that the stream is a sequence of independently generated symbols (white noise or a Bernoulli process), and is therefore uninformative.

Figure 4:
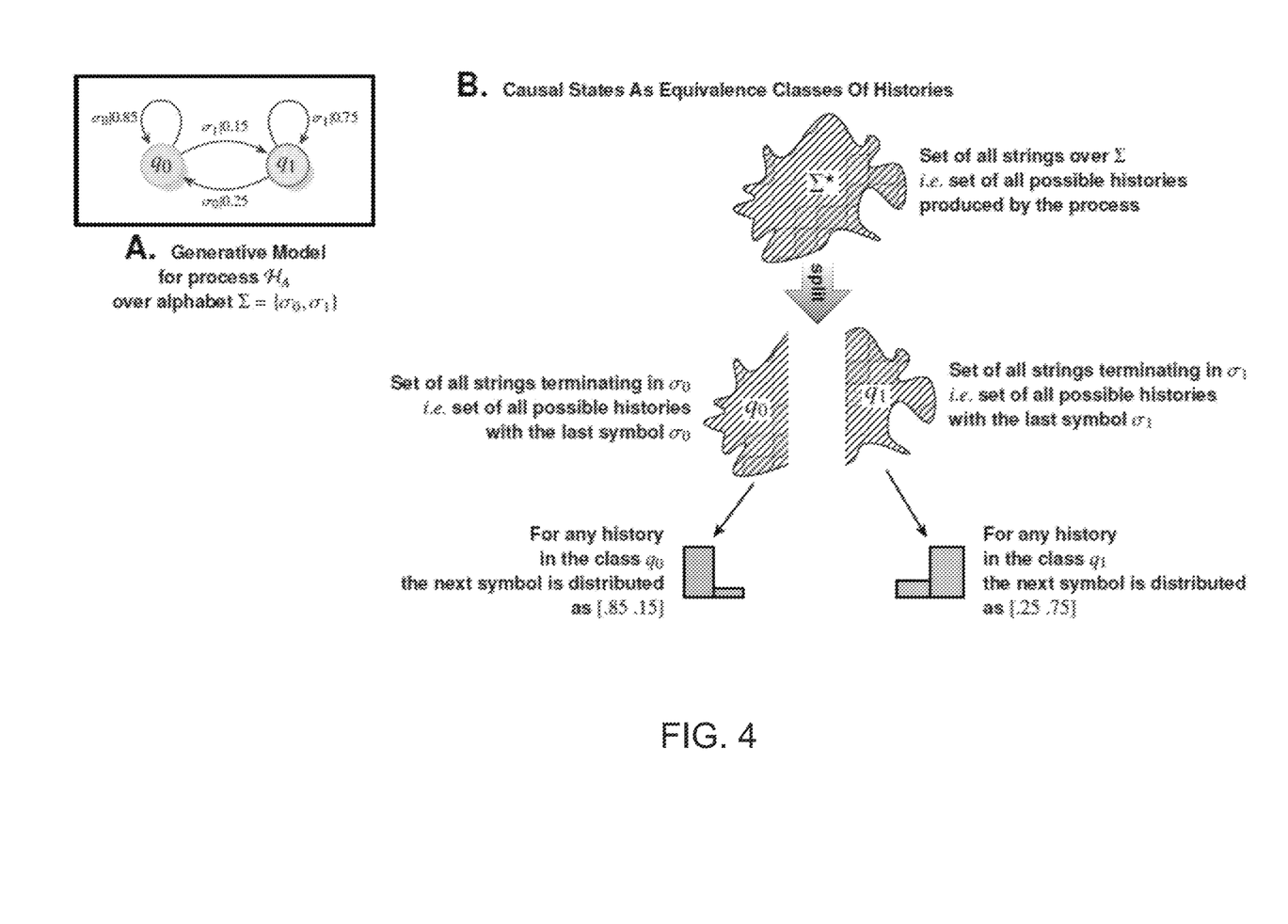

The inference algorithm identifies the number of causal states by searching for distinct "contexts"; sequences, which once transpired, lead to a distinct probability distribution of the next symbol (See FIG. 4).

The computation proceeds as follows:

1) Let the set of all possible sequences up to a length L be denoted as $S_L$

2) Compute the probability of a future symbol (at a specified time shift) being $\sigma_0$ or $\sigma_1$ after a specific string w from the set $S_L$ is encountered; call this distribution $\varnothing_w$ for the sting w. Call the set of probability distributions obtained in this manner as $\Phi$.

3) Find clusters in the set $\Phi$, such that individual clusters are separated by some pre-specified distance $\in>0$. These clusters represent the causal states, since they are classes of histories (sequences) that lead to identical immediate future.

4) Suppose string w is in cluster $q_i$, and sequence $w\sigma_0$ is in cluster $q_j$; it then follows that in the inferred PFSA, there is a transition labeled $\sigma_0$ from the corresponding state $q_i$ to state $q_j$. Carrying out this procedure for each symbol of the alphabet for each inferred cluster or state, identifies the complete transition structure of the model.

5) Once the transition structure is identified, we choose an arbitrary initial state, and step through the model as dictated by the input data stream. We count the number of times each edge or transition is traversed, and by normalizing the count we get an estimate of the edge probabilities. This completes the PFSA inference.

Formal Definition of PFSAs and Future Prediction

Mathematically, a PFSA is a 4-tuple $G=(Q, \Sigma, \delta, \tilde{\pi})$, where Q is the set of states, $\Sigma$ is the symbol alphabet. $\delta: Q\times\Sigma\rightarrow Q$ is the transition function specifying the graph structure, such that for any state $q\in Q$, $\delta(q,\sigma)\in Q$ is the end state of the transition from state q via symbol: $\sigma$, and, $\tilde{\pi}: \Sigma\times Q\rightarrow[0, 1]$ is the symbol probability of generating the symbol $\sigma\in\Sigma$ with the constraint:

$$\forall q\in Q, \Sigma_{\sigma\in\Sigma}\tilde{\pi}(q,\sigma)=1 \qquad (6)$$

We specify a time shift $\Delta$ when we infer a PFSA G from a given input stream; this time shift is the delay with which the inferred model makes predictions. Specifically, each transition step in G is translated to $\Delta$ steps in the quantized stream. Thus, if we know that the current state in the model is $q_0$, then the predicted symbol $\Delta$ steps in future is $\sigma$ with probability $\tilde{\pi}(q_0, \sigma)$. Note that if we have two models $G_1=(Q_1, \Sigma, \delta_1, \tilde{\pi}_1)$ and $G_2=(Q_2, \Sigma, \delta_2, \tilde{\pi}_2)$ with time shifts $\Delta_1$ and $\Delta_2$ respectively, then with each step the models make predictions at different points in time in future.

Note that to make a prediction using a PFSA, we must know the current state. This is non-trivial in general due to the synchronization problem. We find an approximation of the current state as follows:

1) Compute the stationary distribution on the PFSA states using standard Markov chain tools.

2) Treat the stationary distribution row vector $\wp$ as the initial state distribution. The rationale here is that if we assume that the model is operating for sufficiently long, then the current distribution must be very close to the stationary distribution in the expected sense.

3) Compute the square matrices $\Gamma_\sigma \in \mathbb{R}^{|Q| \times |Q|}$, for each symbol $\sigma \in \Sigma$, such that the $ij^{th}$ element of $\Gamma_\sigma$, denoted as $\Gamma_\sigma|_{ij}$, is the probability of going from state $q_i$ to state $q_j$ via the symbol $\alpha$.

4) Use a relatively short history $h = \alpha_1 \ldots \sigma_l$ of past symbols (before the current time) to update the state distribution as follows:

$$\wp^{[k]} = \text{normalize}(\wp^{[k-1]} \Gamma_{h_k}), k = 1, \ldots, l \quad (7)$$

where $h_k$ is the $k^{th}$ entry of the short history h, and $\wp^{[k]}$ is the state distribution at step k. It follows from ergodicity that the updated distribution $\hat{t}$ is an estimate of the current state distribution.

The predicted distribution over the symbol alphabet $\hat{}$ steps in future (if the time shift for the model is $\hat{}$), is then simply:

$$Pr(\sigma \text{ predicted} = \sigma) = \Sigma_{q \in Q} \wp_q^{l} \hat{\pi}(q, \sigma) \text{ (After } \Delta \text{ time steps)}$$

where $\wp_q^l$ is the current probability for state q, i.e., the entry corresponding to state q in $\wp^l$.

Cross Models

Figure 3B:
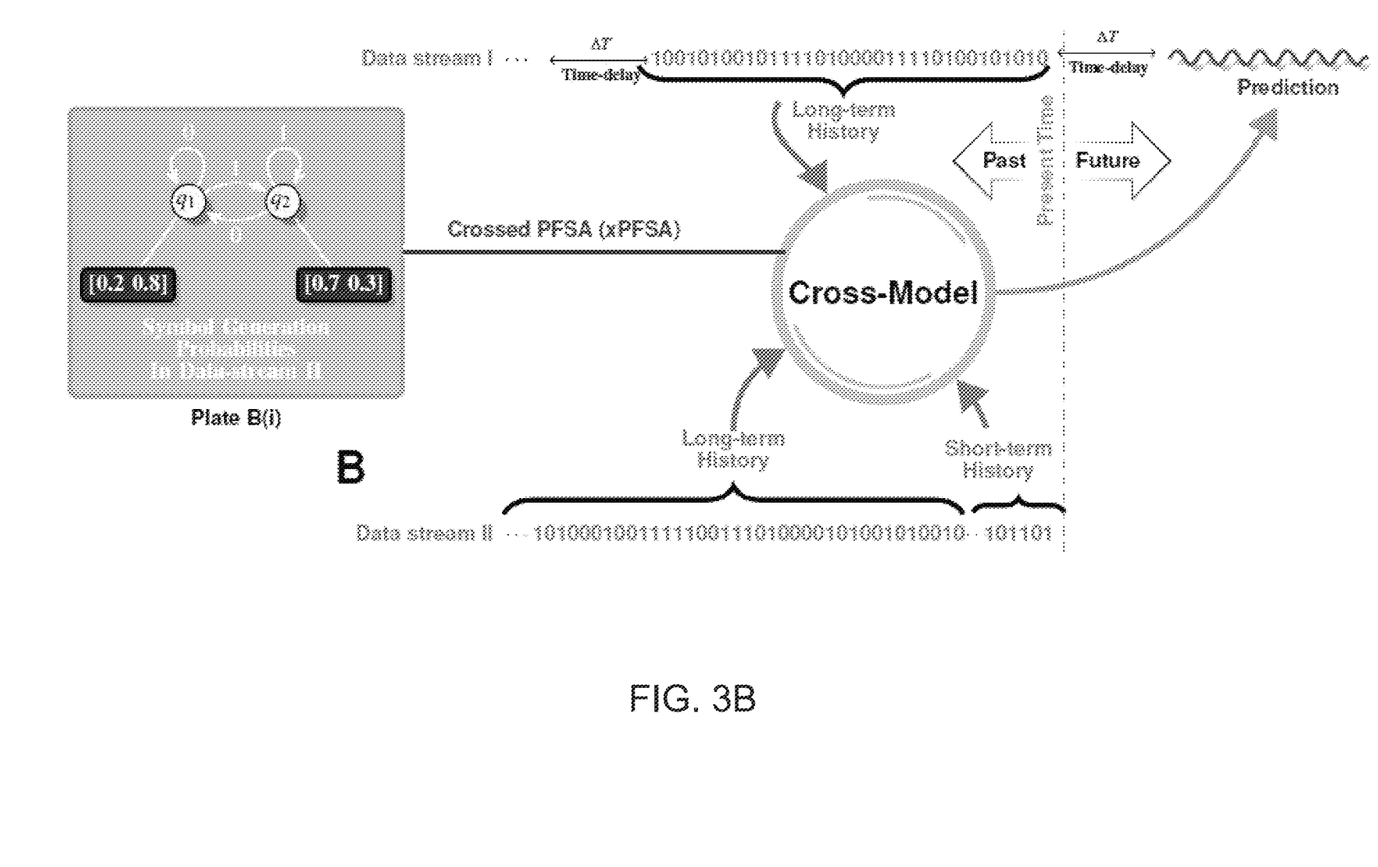

Unlike a self model in FIG. 3A which attempts to predict the future symbols in the same stream. FIG. 3B shows a cross model to predict the symbols in a target stream after reading a short history in the source stream. FIG. 3B (Plate B(i)) illustrates a simple cross model with two states. Note that the model syntax is different from a PFSA; in particular there are no probabilities on the arcs, but each state has a specified output distribution. Thus, if we see sequence 101101 in data stream sB, then we are in state q2 in the cross-model, and hence the next symbol in data stream sA is predicted to be 0 with probability 0.7 and 1 with probability 0.3. We call such models crossed Probabilistic Finite State Automata (XPFSA). The states of a cross model or a XPFSA have a slightly different interpretation; while PFSA states are equivalence classes of histories that lead to identical futures in the same stream, the XPFSA are equivalence classes of histories in the source stream that lead to identical futures in the target stream (the future evolution in the target stream does not matter).

Inference of XPFSAs is similar in principle to PFSA inference. Here we have two input data streams, the source stream $s_A$ over the source alphabet $\Sigma_A$, and the target stream $s_B$ over the alphabet $\Sigma_B$. The broad steps are as follows:

1) Let the set of all possible sequences up to a length L, in the source stream $s_A$, be denoted as $S_L^A$ 2) Compute the probability of a future symbol (at a specified time shift) being $\sigma \in \Sigma_B$ in the target stream $s_B$ after a specific string $\omega$ from the set $S_L^A$ is encountered in the source stream; call this distribution $\emptyset_\omega^{S_A, S_B}$ for the string $\omega$. Call the set of probability distributions obtained in this manner as $\Phi^{S_A, S_B}$.

3) Find clusters in the set $\Phi^{S_A, S_B}$, such that the clusters are separated by some pre-specified distance $\in > 0$. These clusters now represent causal states of the cross-dependence between the stream (from $S_A$ to $S_B$), since they are classes of histories (sequences) in the source stream that lead to identical immediate future in the target stream.

4) Suppose string $\omega$ is in cluster corresponding to the state $q_j$, and sequence $\omega \sigma_0$ is in cluster corresponding to $q_j$; it then follows that in the inferred XPFSA, there is a transition labeled $\sigma_0$ from the corresponding state $q_i$ to state $q_j$. Carrying out this procedure for each symbol of the source alphabet for each inferred cluster or state, identifies the complete transition structure of the cross model. Note that the cross-model transitions are only labelled with symbols from the source alphabet.

Figure 5:
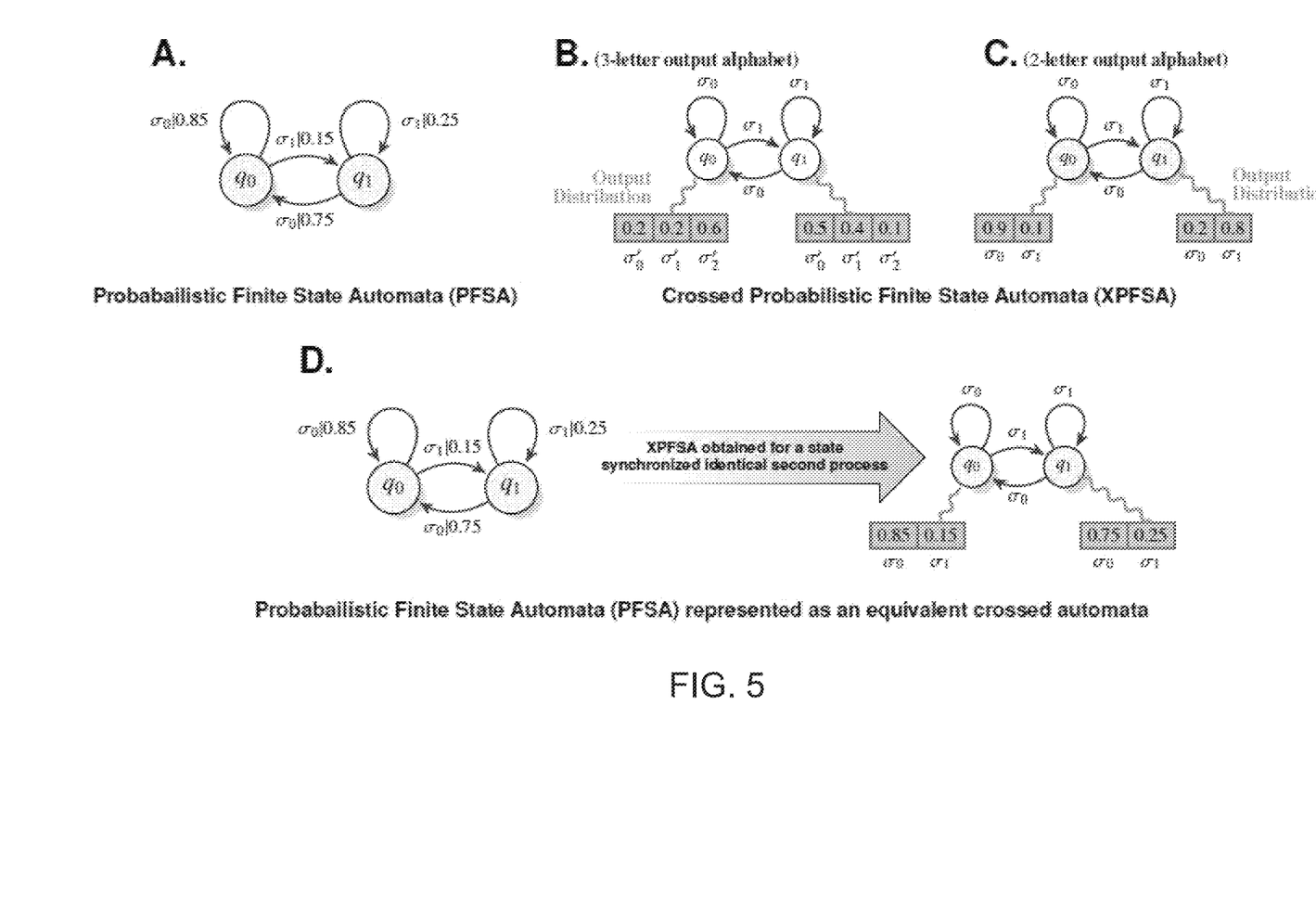

5) Once the transition structure is identified, we choose an arbitrary initial state in the XPFSA, and step through the model as dictated by the source data stream. Every time we reach a particular state in the cross-model, we note down which symbol from the target alphabet $\Sigma_B$ transpires in the target stream (at the specified time shift). Once we reach the end of the input source stream, we normalize the symbol count vectors corresponding to the cross-model states, and this determines the output distribution at each state. Note each output distribution is a probability distribution over the target alphabet (See FIG. 53). This completes the XPFSA inference.

FIG. 5 shows a detailed example of crossed probabilistic Finite State Automata where the alphabet of the source and target streams need not be identical for XPFSAs. It also shows (plate D) that an XPFSA may be thought of as a direct generalization of PFSAs. and any PFSA can be represented as a XPFSA. To see this, note that predicting future symbols in the same stream can be thought of as predicting symbols is a second but identical copy of the first stream.

If all histories in the source stream are equivalent in this sense, then we have a single state XPFSA, implying that the source cannot provide any new information on what is going to happen in the target stream based on its own history, and hence lacks any causal influence on the target. Thus, as before, the complexity of the inferred models is directly related to the statistical complexity of the learnable dynamical relationships underlying the data streams.

The XPFSAs are asymmetric in general, the model for how a source influences a target does not need to be identical when the roles played by the streams are reversed. However two streams are statistically independent if and only if the XPFSAs in both directions are single state machines.

Figure 6:
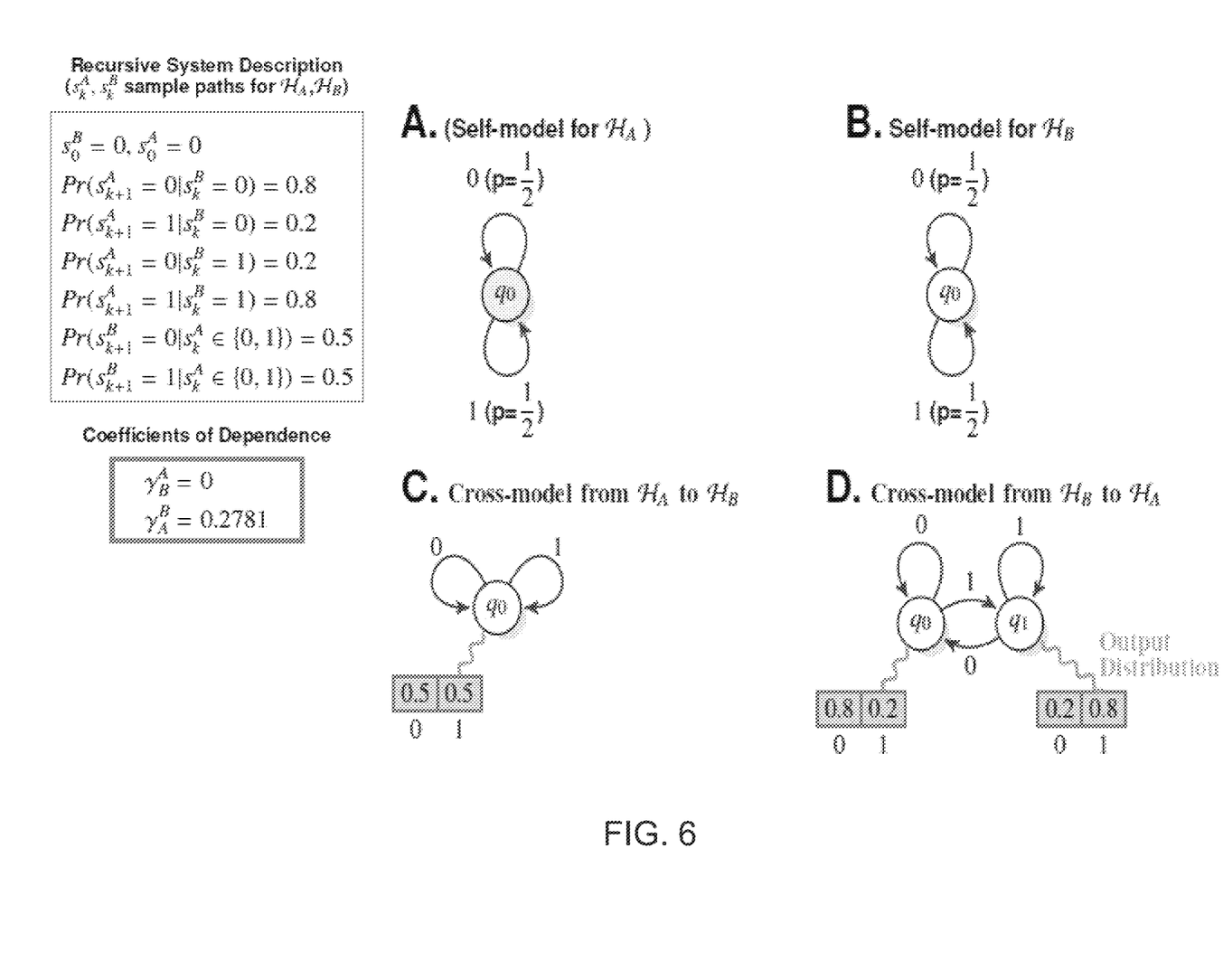

FIG. 6 illustrates an example for unidirectional dependence between processes. This leads us to the notion of the coefficient of causality $\gamma_B^A$ from data stream $s_A$ to data stream $s_B$. True to Granger's notion of statistical casualty, $\gamma_B^A$ quantifies rigorously the amount of additional information that observations on the stream $s_A$ provide about the immediate future in stream $s_B$.

Explicitly, the coefficient is defined as the ratio of the expected change in the entropy of the next-symbol distribution in stream $s_B$ conditioned over observations in the stream $s_A$ to the entropy of the next-symbol distribution in stream $s_B$, conditioned on the fact that no observations are made on stream $S_A$. We show that $\gamma_B^A$ takes values on the closed unit interval, and higher values indicate stronger predictability of $s_B$ from $S_A$. i.e., a higher degree of causal influence. We have $\gamma = 0$ if and only if the inferred machine has a single state, and streams $s_A$, $s_B$ are statistically independent if and only if $\gamma_B^A = \gamma_A^B = 0$.

For the example shown in FIG. 6, $\gamma_B^A = 0$ and $\gamma_A^B = 0.2781$, which reflects the unidirection dependence from B to A. Thus, the interpretation of the causality coefficient which is central to our development is as follows:

$\gamma_A^B=0.3$ (say) from $s_A$ to $s_B$ means that we can acquire 0.3 bits of additional information on average about $s_B$ from each bit read from $s_A$, over what is already available from the past history of $s_B$.

Formal Definition of XPFSAs and Future Prediction

Formally, an XPFSA is also a 4-tuple $G_{A \to B} = (Q, \Sigma_A, \Delta, \tilde{\pi})$, where Q is the set of states, $\Sigma_A$ is the input alphabet. The transition function $\delta: Q \times \Sigma_A \to Q$ is defined as before (for the case of the PFSA), but the symbol probability function is defined as $\tilde{\pi}): Q \times \Sigma_B \to [0, 1]$, with $$\forall q \in Q, \Sigma_{\sigma \in \Sigma_B} \tilde{\pi}(q, \sigma) = 1 \quad (8)$$

where $\Sigma_B$ is the target alphabet, which is distinct from $\Sigma_A$ in general. Note that the symbol distribution specified by $\tilde{\pi}$ is over the target alphabet $\Sigma_B$.

As before, there is a time shift $\Delta$ associated with inferred XPFSA, such that each symbol transition in the model maps to $\Delta$ steps in the target stream. If we know the current state of the XPFSA to be $q_0$, and we observe symbol $\sigma \in \Sigma_A$ in the source stream, then the predicted symbol in the target stream ($\Delta$ steps in future) is $\sigma' \in \Sigma_B$ with probability $\tilde{\pi}(\delta(q,\sigma), \sigma')$.

As before, determining the current state in the XPFSA is non-trivial. We estimate the current state distribution in a manner similar to that used for self models:

1) Note that the XPFSA graph does not have probabilities on it edges. However, the corresponding self model from the source stream does have symbol probabilities on its own edges, and it models the source stream. The problem is that the graph for the self model, and that of the cross model might not be identical. We solve this problem using projective composition of probabilistic automata. This operation takes the self model for the source stream $G_A$, and projects it on the inferred XPFSA graph $G_{A \to B}$, and the result is a PFSA $G_A \vec{\otimes} G_{A \to B}$ with the same structure as that of $G_{A \to B}$.

2) Once we have $G_A \vec{\otimes} G_{A \to B}$, we can estimate its current state as described in the case for self models (using observed symbols in the source stream)

3) Let the current state distribution be $\tilde{\wp}$. Then the predicted future symbol (at time shift $\Delta$) in the target stream is $\sigma' \in \Sigma_B$ with probability:

$$Pr(\sigma_{predicted} = \sigma') = \Sigma_{q \in Q} \tilde{\wp}_q \tilde{\pi}(q, \sigma') \text{ (After } \Delta \text{ time steps)}$$

where, note we are using the $\tilde{\pi}$ from the XPFSA, and not from the projected PFSA $G_A \vec{\otimes} G_{A \to B}$.

Computation of the Coefficient of Causality

Let $H_A$, $H_B$ be stationary ergodic processes over finite alphabets $\Sigma_A$, $\Sigma_B$ respectively. Then the coefficient of causal dependence of $H_B$ on $H_A$, denoted as $\gamma_B^A$, is formally defined as the ratio of the expected change in entropy of the next symbol distribution in $H_B$ due to observations in $H_A$ to the entropy of the next symbol distribution in $H_B$ in the absence of observations in $H_A$. i.e.:

$$\gamma_B^A = 1 - \frac{E\left(h\left(\phi_x^{H_A, H_B}\right)\right)}{h\left(\phi_\lambda^{H_A, H_B}\right)} \quad (9)$$

where the entropy h (u) of a discrete probability distribution u is given by $$\sum_i u_i \log_2 u_i, \lambda$$

is the empty string, and E(.) is the expectation operator over all possible sequences in the source stream. Once the cross model is inferred, computing $\gamma_B^A$ is straightforward.

Decision Fusion from Inferred Models

Each inferred model (both self and cross) predicts the future distribution over the alphabet of the target stream with a specified time delay (in case of self models, the target stream is the source stream itself). We fuse the decisions from multiple models by simple averaging the predicted distributions.

More specifically, assume we have m models predicting the symbol distribution for a stream s at some future time step t. Additionally, let the $i^{th}$ model $M_i$ produce the predicted distribution $v^i$, i.e., if stream s is defined over an alphabet $\Sigma$, then model $M_i$ predicts that $v_j^i$ is the probability of generating symbol $\sigma_j \in \Sigma$ in s at time step t. Then, the fused prediction $v^*_j$ is given by:

$$v^*_j(t) = \frac{1}{m} \sum_{i=1}^{m} v^i_j(t) \quad (10)$$

More sophisticated fusion strategies are possible; for example, the predictions can be weighted with the coefficients of causality. However, we got good results with the simple averaging, and we decided to investigate such strategies in future work.

Model Validation

Various sanity checks can be performed to make sure the models do indeed reflect well-established characteristics of seismic dynamics. In particular, the Omori-Utsu law may be recovered easily, and that shuffling the temporal ordering of the values in the data streams destroys the inferred causality links. Additionally, we check our conclusions with alternate quantization schemes, and show that the inferred causality coefficients exhibit expected degradation as we move away from the source in space and time.

Appendix A entitled "Causality Networks" is part of the U.S. Provisional Application No. 62/170,063 and is also part of this patent document for providing additional information of various implementation details.

The disclosed technology can be implemented in various applications. Examples of such applications include disaster prediction (e.g., earthquakes, extreme weather conditions, occurrences of epidemics in a population), prediction of stock market movements, pricing or demands and supplies of goods or services in seemingly chaotic market conditions, traffic controls for flights or vehicles, prediction of behaviors of power networks for management and operations of the power networks, prediction of behaviors of communication networks for management and operations of communication networks, prediction of user behaviors in social networks, prediction of behaviors of e-commerce activities, and biomedical applications (e.g., inferring functional connectivity in neuronal assemblies and prediction of molecular evolution of retro-viral genomes).

Example 1: Seismic Prediction (Disaster Prediction System)

The proposed algorithm can be used to find predictive models of cross-dependence between the dynamical behavior seismogenic structures separated by thousands of miles, leading to the inference of a causality network that predicts seismic events across the planet. The inputs to the algorithm for both model building and in operational mode needs to be simply the location and magnitude of past events across the globe, e.g., the USGS seismic catalogue.

Example 2: Predicting Price Movements in the Stock Market (Financial Modeling)

The proposed algorithm can be used to predict price movements in the financial markets. Inputs are historical price data, which is used to model the predictive co-dependencies between various stocks, which are then used to inform future predictions.

Example 3: Inferring Functional Connectivity in Neuronal Assemblies (Neuroscience Investigations, Biomedical Applications)

The proposed algorithm will potentially lead to transformative breakthroughs in the inference of network connectivity from sparse spatial sampling of neuronal assemblies. Our algorithm addresses the current shortcomings of the state-of-the-art approaches (e.g. assumption of linearity, difficulty in obtaining significance estimates in nonparametric approaches, absence of a gold standard etc) via providing a new zero-knowledge non-linear non-parametric algorithm that can potentially go beyond functional inference, and distill effective links from data. This approach can lead to the creation of a streamlined computational pipeline that can be deployed for wide use on national resources to effectively and measurably accelerate neuroscientific discovery.

Additional information pertaining to applications of the disclosed technology are described in Appendix B and Appendix C, which are included as part of this patent document and are also part of the U.S. Provisional Application No. 62/170,063.

Appendix D entitled "IMPLEMENTATION DETAILS" is included as part of this patent document and supplements Appendix A for additional information in implementing the process shown in FIG. 2.

While this patent document and attached appendices contain many specifics, these should not be construed as limitations on the scope of any invention or of what may be claimed, but rather as descriptions of features that may be specific to particular embodiments of particular inventions. Certain features that are described in this patent document and attached appendices in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document and attached appendices should not be understood as requiring such separation in all embodiments.

Only a few implementations and examples are described and other implementations, enhancements and variations can be made based on what is described and illustrated in this patent document and attached appendices.

What is claimed are techniques and structures as described and shown, including:

1. A method for predicting future behavior based on historical data, comprising:
   obtaining a first data stream and a second data stream from the historical data;
   inferring a model for a pair of data streams including the first data stream and the second data stream, wherein the model includes one or more degrees of causal dependence between the first data stream and the second data stream,
   wherein the model includes a coefficient of causality including a ratio of an expected change in entropy of a next-symbol distribution in the second data stream conditioned over observations in the first data stream to the entropy of the next-symbol distribution in the second data stream conditioned on a fact that no observations are made on the first data stream;
   instantiating a causality network including the model; and
   predicting, using the causality network, the future behavior by predicting the second data stream based on the model and the first data stream.

2. The method of claim 1, wherein the first data stream and the second data stream include quantized or symbolic data streams generated by ergodic stationary sources.

3. The method of claim 2, wherein the model is produced by including a non-parametric test of Granger causality for the first data stream and the second data stream.

4. The method of claim 1, further comprising producing a graph depicting directional flow of the causal dependence between the first data stream and the second data stream.

5. The method of claim 1, wherein the coefficient of causality quantifies an amount of additional information that observations on the first data stream provide about an immediate future in the second data stream.

6. The method of claim 1, wherein the method is implementable without a priori information about the first data stream and the second data stream.

7. A non-transitory computer readable medium having code stored thereon, the code, when executed by a computer, causing the computer to implement a method for predicting future behavior based on historical, the method comprising:
   obtaining a first data stream and a second data stream from the historical data;
   inferring a model for a pair of data streams including the first data stream and the second data stream, wherein the model includes one or more degrees of causal dependence between the first data stream and the second data stream,
   wherein the model includes a coefficient of causality including a ratio of an expected change in entropy of a next-symbol distribution in the second data stream conditioned over observations in the first data stream to the entropy of the next-symbol distribution in the second data stream conditioned on a fact that no observations are made on the first data stream;
   instantiating a causality network including the model; and
   predicting, using the causality network, the future behavior by predicting the second data stream based on the model and the first data stream.

8. The computer readable medium of claim 7, wherein the first data stream and the second data stream include quantized or symbolic data streams generated by ergodic stationary sources.

9. The computer readable medium of claim 8, wherein the model is produced by including a non-parametric test of Granger causality for the first data stream and the second data steam.

10. The computer readable medium of claim 7, wherein the method further includes producing a graph depicting directional flow of the causal dependence between the first data stream and the second data steam.

11. The computer readable medium of claim 7, wherein the coefficient of causality quantifies an amount of additional information that observations on the first data stream provide about an immediate future in the second data stream.

12. The computer readable medium of claim 7, wherein the method is implementable without a priori information about the first data stream and the second data stream.

\* \* \* \* \*